Patented Oct. 13, 1925.

1,556,658

UNITED STATES PATENT OFFICE.

HARRY M. WILLIAMS, OF DAYTON, OHIO, ASSIGNOR TO GENERAL MOTORS RESEARCH CORPORATION, OF DAYTON, OHIO, A CORPORATION OF DELAWARE.

BEARING MATERIAL.

No Drawing. Application filed March 24, 1922, Serial No. 546,478. Renewed April 6, 1925.

*To all whom it may concern:*

Be it known that I, HARRY M. WILLIAMS, a citizen of the United States of America, residing at Dayton, county of Montgomery, and State of Ohio, have invented certain new and useful Improvements in Bearing Materials, of which the following is a full, clear, and exact description.

The present invention relates to methods of making bearing materials and in its preferred form of embodiment which has been chosen for the purpose of description, relates more particularly to the making of bearing materials which have lubricating characteristics.

Among the objects of the invention are to greatly shorten the time heretofore considered necessary to produce bearings of a similar sort and yet make a satisfactory bearing. Another object is to improve the strength and other characteristics of such bearings.

With these and other objects in view the invention comprises the production of a bearing composition, which composition consists mainly of bearing metal, preferably bronze having distributed through its mass lubricating material.

Materials analogous to the present material have been known for some time and have been used both for bearings and for brushes for electrical apparatus, however, such materials have not been successfully used because of various difficulties encountered. For example, the material most commonly used for electrical brushes is usually too soft and of insufficient strength for bearings, if the bearing pressures are high.

Another objection to most of the materials referred to lies in the fact that they are usually insufficiently porous to retain lubricant in quantities sufficient to be of any value as a reserve supply in case of failure of the lubricating system or too infrequent oiling.

In the present invention a composition is produced which is composed of a bearing material suitable for high pressure bearings, yet having a sufficient porosity to absorb and retain a relatively large quantity of lubricant capable of acting as a sufficient reserve. Bearings produced by the present process will have a compression strength of well up toward 75,000 pounds per square inch, will in some cases absorb up to 8% by wt. of oil and may be produced in a relatively short time.

In carrying out the present process powdered metals, preferably copper and tin, are intimately mixed in the proportions to form a suitable bearing bronze. Proportions that have been found satisfactory are 90% copper and 10% tin. These metals are preferably of such fineness that they will substantially all pass a 200 mesh screen and are mixed in the proportion indicated with substantially pure graphite powder up to 8%, preferably 6% also in very fine state of subdivision, preferably 200 mesh.

As a general rule it may be stated that the size of the metal particles used has considerable bearing upon the properties of the product, a very finely powdered metal giving a better product than a coarser one. In fact, the copper powder that so far has been found most satisfactory is of such fineness that over 70% will pass a 350 mesh screen, over 85% will pass a 200 mesh screen, and 100% will pass a 150 mesh screen. A tin powder which has given satisfactory results is substantially of a size to pass 100% through a 200 mesh screen.

The mixing of the several powders is accomplished in any suitably efficient manner such as by ball mill or screening in the conventional fashion.

After the materials have been intimately mixed, they are put into a suitable die and compressed into bushing form or into whatever other forms it may be desired to make, using a pressure of 40,000 to 100,000 pounds per square inch. The pressures to be used for maximum strength are substantially such as to cause a density of the compressed material equal to that of an alloy of the same analysis, maximum strength however is not always desirable as this carries with it a decrease in porosity. For this reason it has been found that an average pressure of 75,000 pounds per square inch will produce the most uniformly satisfactory results.

After the formed articles have been removed from the die, they are packed in lamp black, or a mixture of lamp black and sand, in a container which may be tightly sealed and the whole heated to a temperature of from 1,100° to 1,400° F., preferably about 1,200° F., for a period of about 5 to 7 hours. It has been found that heating to this temperature for a longer period will not result in any apparent benefit although it seems to be of no detriment.

After the articles have been subjected to this heating step, they are cooled and removed from the lamp black, after which they may be ground or broached to dimension.

When the bushing or other article has been so finished, it is impregnated with a suitable lubricant such as oil, by any suitable method such as boiling in oil or by the use of an exhaust and pressure impregnating process. The bushing is then ready to be put in place for use.

It will of course be understood that the composition of these bushings may be varied considerably without departing from the spirit of the present invention. For example, the proportions of copper and tin may be varied to change the composition of the resultant bronze within a fairly wide range and other metals may be added for the purpose of varying the properties of the bearing material. In certain instances lead up to 4 or 5% might be of advantage and bearings of this composition would be say 94% to 96% of a mixture of metal powders of 92% copper, 4% tin and 4% lead, with about 4 to 6% of graphite. The preferred composition, however, is copper, tin, and graphite of the proportions 90, 10, and 6 parts respectively.

Further, it has been found that a variation of the compression pressure will vary the characteristics of a product to the extent that the higher the pressure, the greater the compression strength of the product and the less the porosity. On the other hand by lowering the compression pressure the porosity may be increased at the expense of the compression strength.

As stated above the product made in the manner described has a very high compression strength, is quite porous and has graphite distributed throughout its mass. This graphite lies in the interstices between the metallic walls but does not plug the pores as is proven by the fact that the material will absorb oil. Where copper, tin and graphite are used without other metals, microscopic examination reveals the fact that the metallic portion of the product is a true bronze, the parts between the pores having the characteristic bronze structure.

While the above description shows the preferred form of embodiment of the invention it should be understood that variations may be made therein without departing from the scope of the claims which follow.

What I claim is as follows:

1. The method of producing bearing compositions which comprises intimately mixing finely divided copper, tin and graphite; compressing the mixture into the desired form under very high pressure; packing the formed material in lamp black and sealing in a container; and heating the formed material to 1100° to 1400° F. for 5 to 7 hours.

2. The method of producing bearing compositions which comprises intimately mixing finely divided copper, tin and graphite in the proportion of 90 parts copper, 10 parts tin and 4 to 6 parts graphite; compressing the mixture into the desired form under 40,000 to 100,000 pounds per square inch; packing the formed material in lamp black and sealing in a container; and heating the formed material to 1100° to 1400° F. for 5 to 7 hours.

3. The method of producing bearing compositions which comprises intimately mixing finely divided copper, tin and graphite, the copper and tin being in the proportion to form a bronze; compressing the mixture into the desired form under very high pressure; packing the formed material in lamp black and sealing in a container; and heating the formed material to 1100° to 1400° F. for 5 to 7 hours.

4. The method of producing bearing compositions which comprises intimately mixing finely divided copper, tin and graphite, the copper and tin being in the proportion to form a bronze; compressing the mixture into the desired form under pressures up to the amount sufficient to produce a density substantially the same as the density of an alloy of the same composition; packing the formed material in lamp black and sealing in a container; and heating the formed material to 1100° to 1400° F. for 5 to 7 hours.

5. The method of producing bearing compositions which comprises intimately mixing finely divided copper, tin and graphite; compressing the mixture into the desired form under very high pressure; packing the formed material in lamp black and sealing in a container; heating the formed material to 1100° to 1400° F. for 5 to 7 hours; and cooling the formed material and impregnating with lubricant.

6. The process of making a bearing composition which consists in intimately mixing finely divided copper and tin, in the proportions to form a bearing bronze, with about 6% of finely divided graphite; molding the mixture under pressures up to the amount sufficient to produce a density substantially the same as the density of an alloy of the same composition; then heating the molded mixture to such a temperature and for such a time as to cause the tin to diffuse into the copper and form the desired bronze; the heating being conducted in a non-oxidizing atmosphere.

7. The process of making a bearing composition which consists in intimately mixing finely divided copper and tin in the proportions to form a bearing bronze, with about 6% of finely divided graphite; molding the mixture under pressures up to the amount sufficient to produce a density substantially the same as the density of an alloy of the same composition; then heating the molded mixture to about 1100° to 1400° F. for 6 hours in a nonoxidizing atmosphere.

In testimony whereof I hereto affix my signature.

HARRY M. WILLIAMS.